July 18, 1944. F. L. YERZLEY 2,353,952
SPRING
Filed Jan. 19, 1942

INVENTOR.
FELIX L. YERZLEY
BY Kwis Hudson & Kent
ATTORNEYS

Patented July 18, 1944

2,353,952

UNITED STATES PATENT OFFICE 2,353,952

SPRING

Felix L. Yerzley, Verona, N. J.

Application January 19, 1942, Serial No. 427,285

10 Claims. (Cl. 248—358)

This invention relates to springs especially adapted for so supporting devices and apparatus as to effectively dampen vibrations and shocks to which the same may be subjected. These springs are particularly adapted for supporting comparatively light loads such as instruments, instrument panels and other apparatus in airplanes although they are also well adapted for a wide variety of other applications and for comparatively heavy loads.

Some of the objects of the invention are to provide a spring of the type referred to that will give reliable and highly satisfactory service as a vibration-dampening and shock-absorbing support, that is simple in design and relatively inexpensive to manufacture and that is adapted for a wide variety of applications.

Essentially my invention consists of a rubber ring, of circular or other shape, which is attached to each of two relatively movable mounting members at a plurality of points, these points of attachment being symmetrically arranged around the ring in spaced relation and the points of attachment to one of said members being alternately arranged relative to those of the other member. Relative movement of the two mounting members is accommodated by the elasticity of the sections of the rubber ring between the points of attachment. While I have mentioned a rubber ring above, I have used the word "rubber" in the broad sense to denote any material, natural or synthetic, which will perform as an elastic material in substantially the same manner as natural rubber. Neoprene and butadiene rubbers are typical synthetic materials that may be used in constructions embodying my invention.

In the acompanying drawing, I have illustrated preferred forms of my invention but the principles of the invention may be embodied in a wide variety of designs to suit the requirements of different applications of a spring of this type. In this drawing.

Figure 1:
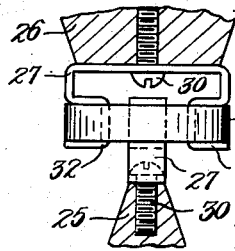
Fig. 1 is a side elevation of a relatively simple form of spring construction embodying my invention.
Figure 2:
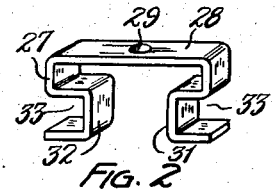
Fig. 2 is a perspective view of one of the mounting members shown in Fig. 1.
Figure 3:
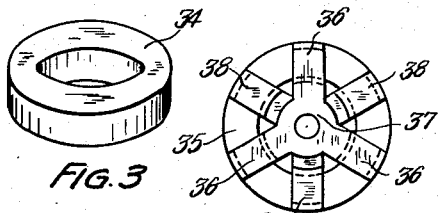
Fig. 3 is a perspective view of the rubber ring shown in Fig. 1.

Referring to the construction shown in Figs. 1 to 3, inclusive, the two members to be connected are indicated at 25 and 26. One of these members may be a supporting base and the other an instrument or piece of apparatus to be supported. In this case the spring consists of two mounting members 27 which are coaxially but reversely arranged and each of which comprises a base 28 having a central perforation 29 for an attaching screw 30. At the ends of the base 28 are hook or yoke-like portions 31 and 32 which provide outwardly opening recesses or seats 33 for the rubber ring 34.

From Fig. 1 it will be noted that the mounting member 27 attached to the support 25 is arranged at right angles to the mounting member attached to the support 26 and that the hooks containing the recesses 33 are symmetrically and uniformly spaced circumferentially of the axis of the device which, in this case, would pass through the screws 30. By this arrangement the recesses 33 form collectively what is, in effect, a circular groove in which there is a ring, preferably made from rubber, so that the ring is readily expansible and deformable. Thus it is possible during assembly of the spring to expand the ring 34 sufficiently to have it enter the recesses 33 in the mounting members 27 and when the ring 34 is mounted, as shown in Fig. 1, it forms a resilient connection between the mounting members.

Figure 7:
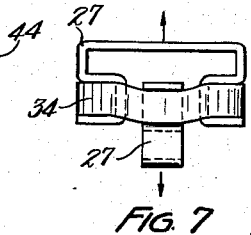
Fig. 7 is a side elevation of the spring shown in Fig. 1 and diagrammatically illustrating the effect of tension forces applied to the mounting members.
Figure 8:
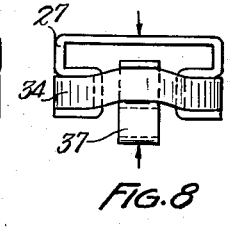
Fig. 8 is a similar view illustrating the effect of compression forces.
Figure 9:
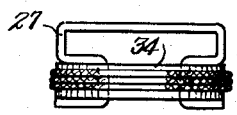
Fig. 9 is a similar view but illustrating means for clamping the rubber ring in the attaching arms.

From the foregoing it will be apparent that the hooks 31 and 32 of the mounting members are alternately arranged so that when the parts are assembled the sections of the rubber ring between the hooks will be free to deform in accordance with any load to which the device is subjected. Thus in Fig. 7 there is indicated the deformation of the ring 34 under a tension load tending to separate the two mounting members 27. In a similar manner the deformation of the ring 34, under a compression load, is illustrated in Fig. 8. The spring is also adapted for torsion stresses but in such cases, of course, the ring 34 should be secured in the recesses 33 and various means may be employed for so securing the ring. One such means is illustrated in Fig. 9 wherein a flexible cord or band may be tightly wound on the outside of the ring 34.

In the constructions above described the rubber ring 34 is in the form of an annulus but it will be understood that the ring may also take other shapes than circular and that one of the essential principles of construction to be observed is that the hooks of the mounting members should be alternately and uniformly positioned and connected by an elastic ring or its equivalent. A spring thus made provides a type of elastic supporting means not possible with the usual shear or compression-type mounting. By using relatively long lengths of rubber between the hooks of the mounting members, the spring may be made to have a very low spring-rate, much lower than would be possible with the same volume of rubber in a practical design of most other types. The spring-rate for this type of mounting can be varied by varying the dimensions and proportions of the rubber part as well as by varying the elastic modulus of the rubber composition itself.

In the Fig. 1 construction, each mounting member 27 has two hooks or points of attachment to the rubber ring. In the example given in Fig. 4 greater stability in the plane of the rubber ring 35 is obtained by the use of three hooks 36 on the mounting member 37 and three hooks 38 on the other mounting member, thus giving a total of six points of support. This increase does not modify the basic nature of the device since an alternation of the hooks is provided and there is uniform spacing and engagement of the rubber ring 35. In general, the invention is not limited to any specified number of supporting points for engaging the rubber ring of the device.

Figure 4:
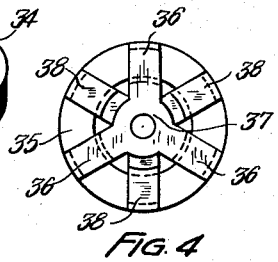
Fig. 4 is a plan view of a modification of the construction shown in Fig. 2, to provide three attaching arms on each of the mounting members.

In the Fig. 1 construction, the hooks 31 and 32 are of constant width with their sides parallel to each other and the same is true of the construction illustrated in Fig. 4. The exact shape of the hooks is immaterial except that their shape and spacing will be determining factors in connection with the design of a spring to obtain a required spring-rate.

Figure 5:
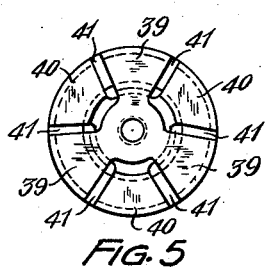
Fig. 5 is a view similar to Fig. 4 but illustrating attaching arms of a different form.

In Fig. 5 I have illustrated the mounting members as comprising the fan-shaped hooks 39 on one mounting member and fan-shaped hooks 40 on the other mounting member, thus leaving only a small section of the rubber ring exposed between successive hooks, as will be seen at the points 41.

Figure 6:
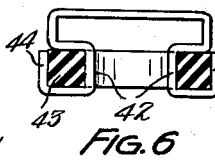
Fig. 6 is a side elevation of a modification of the mounting members of Fig. 1 to provide attaching arms which completely enclose a section of the rubber ring.

As above stated various means may be employed for securing the rubber ring of the device to the hooks or supports of the mounting members. In Fig. 6 I have shown extensions on the hooks 42 which are bent around the outside of the rubber ring 43, as indicated at 44, thereby producing a clamping effect.

Figure 10:
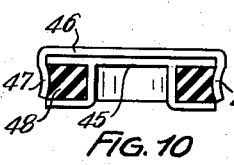
Fig. 10 is a side elevation of an attaching member with another form of clamping means, the rubber ring being in section.

In Fig. 10 I have illustrated another form of means for clamping the rubber ring and, in this case, the mounting member 45 carries a part 46 having its ends 47 bent to engage the periphery of the rubber ring 48 and depress the same.

Figure 11:
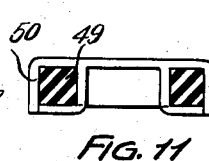
Fig. 11 is a similar view of another form of attaching member, with integral clamping means.

Another form is shown in Fig. 11 wherein the ring 49 is clamped by means of extensions 50 which are bent over the outside or periphery of the rubber ring and compress the latter.

Figure 12:
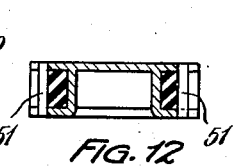
Fig. 12 is a similar view with another form of clamping means.

In Fig. 12 there is illustrated another clamping device consisting of pins 51 which are arranged in openings in the side walls of the hooks of the mounting members and suitably secured.

Figure 13:
Fig. 13 is a view similar to Fig. 10 of another form of attaching member.
Figure 14:
Fig. 14 is an end elevation of the same.

Another means for gripping the rubber ring is illustrated in Figs. 13 and 14 wherein the side walls of each of the hooks are so formed as to provide a constriction into which a rubber ring 52 is forced.

Figure 15:
Fig. 15 is a view similar to Fig. 12 but showing a different form of clamp.
Figure 16:
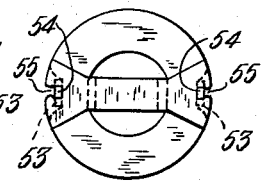
Fig. 16 is a fragmentary plan view of the same.

In Figs. 15 and 16 there is illustrated a clamping means consisting of a clamping strip 53 having lugs 54 which are secured in suitable slots 55 in the edges of the walls of the hooks.

Figure 17:
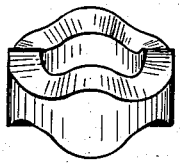
Fig. 17 is a perspective view of a modified form of rubber ring.

The foregoing illustrations of means for securing the rubber ring in position in the hooks of the mounting members are not intended to cover the entire range of possible means for obtaining this result. For example, certain advantages can be obtained in conjunction with the foregoing by modifying the shape of the rubber ring itself. For example, the ring 52 in Fig. 13 may be molded with a constriction to fit the hooks of the mounting members and enlarged at the stressed portions between the hooks and a ring of this type is illustrated in Fig. 17.

Figure 18:
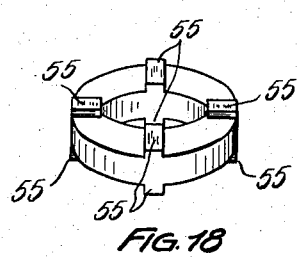
Fig. 18 is a perspective view of another form of rubber ring.

A further modification, also obtainable by molding the rubber ring, is to provide projections 56 on the rubber ring, as illustrated in Fig. 18, these projections extending into the interstices between the hooks of the mounting members.

While all of the illustrations described above include rubber rings that are in the form of an annulus, it might be desirable, in some cases, to use a slightly elliptical or oval ring or one of polygonal form. It may also be found advisable for some designs to provide adhesion between the hooks and the rubber ring by the use of cement or other means.

While I have illustrated and described what I now consider to be some of the preferred ways of carrying my invention into practical use, it will be understood that numerous changes may be made in the details of construction without departing from the spirit of the invention as defined in the appended claims.

I claim:

1. A rubber spring comprising a continuous loop of rubber and two concentric clusters of radial supports in intermeshing relation with spaces therebetween, said supports having portions embracing the rubber loop at spaced points such that said clusters are elastically joined by the rubber loop and any relative motion of the two clusters of supports will deform the rubber exposed in the radial spaces between the supports.

2. In a spring of the class described, the combination of a pair of coaxially arranged mounting members each provided with a plurality of radial arms having seats adjacent their extremities, the arms of said members being in intermeshing relation with spaces therebetween, and a readily expansible and deformable elastic ring having free engagement with said seats so as to form a resilient connection between said members.

3. In a spring of the class described, the combination of a pair of mounting members each provided with a plurality of arms having seats adjacent their extremities, the arms of said members being alternately arranged in circumferentially spaced relation about an axis, and a readily expansible and deformable elastic ring engaging said seats so as to form a resilient connection between said members.

4. In a spring of the class described, the combination of a pair of coaxial reversely arranged mounting members each provided with a plurality of arms, the arms of said members being alternately arranged in circumferentially spaced relation about the axis of the members and each arm having a yoke-like outwardly open recess, said recesses being aligned circumferentially and collectively forming a substantially circular groove, and a readily expansible and deformable elastic ring engaging said recesses and forming a resilient connection between said members.

5. In a spring of the class described, the combination of a pair of coaxial reversely arranged mounting members each provided with a plurality of arms, the arms of said members being alternately arranged in circumferentially spaced relation about the axis of the members and each arm having a yoke-like outwardly open recess, said recesses being aligned circumferentially and collectively forming a substantially circular groove, a readily expansible and deformable elastic ring engaging said recesses and forming a resilient connection between said members, and means for holding said ring against circumferential displacement in said recesses.

6. In a spring of the class described, the combination of a pair of coaxial reversely arranged mounting members each provided with a plurality of arms, the arms of said members being alternately arranged in symmetrically and uniformly spaced relation about the axis of the members and each arm having a yoke-like outwardly open recess, said recesses being aligned circumferentially and collectively forming a substantially circular groove, and a readily expansible and deformable elastic ring engaging said recesses and forming a resilient connection between said members.

7. A flexible device of the class described, comprising a ring of rubber, and two members each having a plurality of means engaging said ring at circumferentially spaced points, said points of engagement of each member being alternately arranged with respect to those of the other member and said means so holding said points as to prevent inward radial movement thereof and to permit relative movement of said members by the flexing of the free portions of said ring between said means.

8. A flexible device of the character described, comprising a continuous elastic loop of rubber, and a pair of mounting members flexibly connected by said loop, said members having connections with said loop at substantially equally spaced points therearound, the connections of one member with said loop being in alternate relation to and spaced from the connections of the other member with the loop so as to leave deformable portions of the loop exposed between said connections.

9. A flexible device of the character described, comprising a pair of substantially coaxial complemental members having arm portions in intermeshing relation with a space between each two contiguous arm portions, and a resilient loop engaging said arm portions and flexibly connecting said members so as to permit relative axial and relative tilting movements therebetween.

10. A flexible device of the character described, comprising a pair of substantially coaxial complemental members having hook portions in intermeshing relation with spaces between the contiguous hook portions, and an elastic loop engaging in said hook portions and forming a flexible connection between said members.

FELIX L. YERZLEY.